Figure 1:
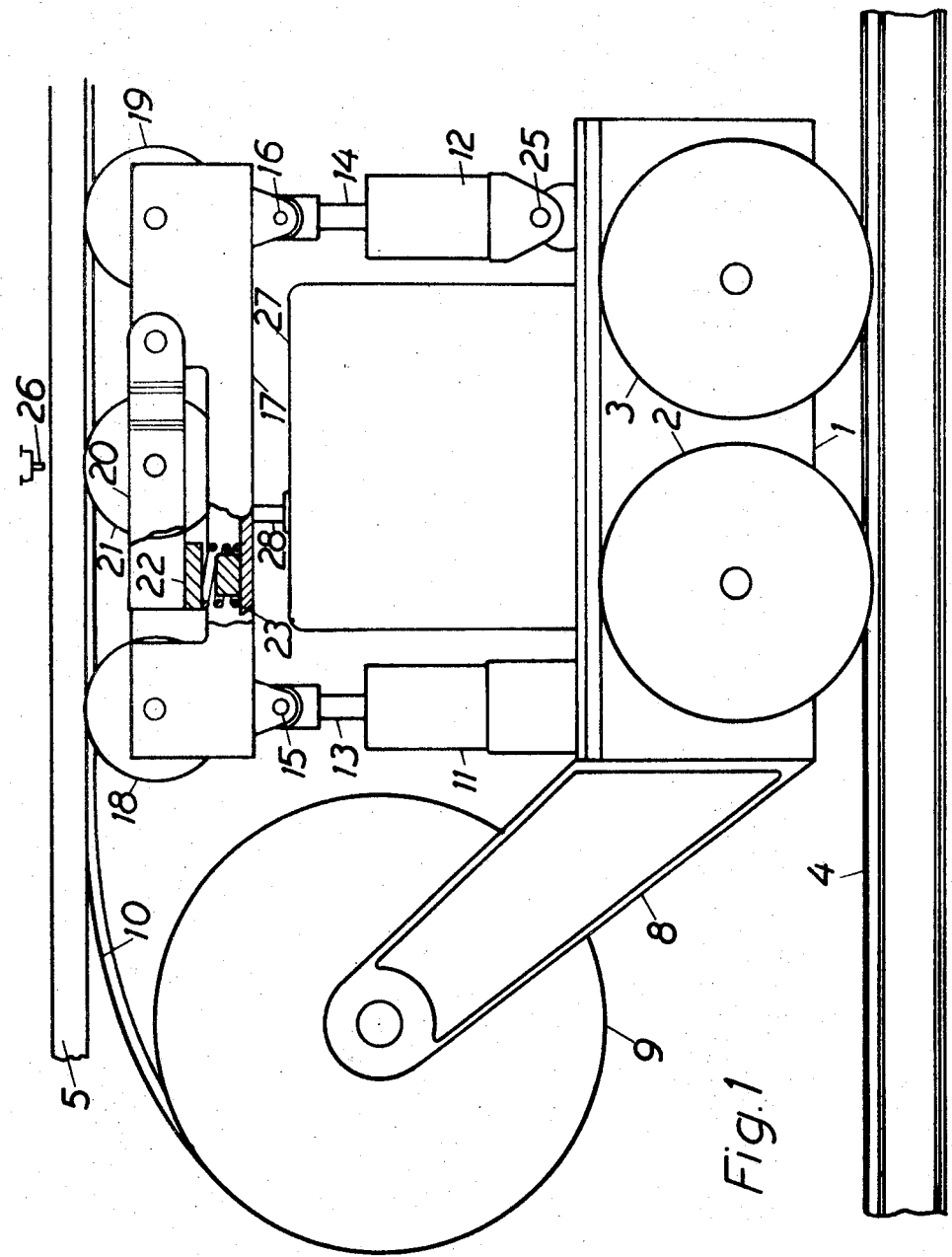

United States Patent

[11] 3,575,574

| | | | |
|---|---|---|---|
| [72] | Inventor | Goran Folke Almqvist Goteborg, Sweden | |
| [21] | Appl. No. | 839,242 | |
| [22] | Filed | July 7, 1969 | |
| [45] | Patented | Apr. 20, 1971 | |
| [73] | Assignee | Elektriska Svetsningsaktiebolaget Goteborg, Sweden | |
| [32] | Priority | July 11, 1968 | |
| [33] | | Sweden | |
| [31] | | 9536/68 | |

[54] METHOD OF BACKING STRIP REMOVAL
3 Claims, 14 Drawing Figs.

[52] U.S. Cl. .................................................. 219/137,
219/160, 219/73, 219/74
[51] Int. Cl. ........................................................ B23k 9/00
[50] Field of Search ............................................. 219/137,
160, 130, 125, 124, 72, 73, 74; 228/50

[56]                References Cited
                 UNITED STATES PATENTS
1,499,770    7/1924   Gruenfeldt ................... 219/137
1,939,772   12/1933   Greene ......................... 219/137X
2,258,913   10/1941   Stone ........................... 219/137X
2,340,796    2/1944   Chyle ........................... 219/137X
2,366,579    1/1945   Von Ahrens ................. 219/160X
3,195,929    7/1965   Ott ............................... 219/61X
3,328,556    6/1967   Nelson et al. ................. 219/137

*Primary Examiner*—J. V. Truhe
*Assistant Examiner*—George A. Montanye
*Attorney*—Cameron, Kerkam & Sutton

ABSTRACT: A method of making a butt weld between sheet steel members having a thickness of 0.2 in. or more, comprising the steps of welding the sheet steel members from one side only by the consumable-electrode arc welding process with the aid of a backing strip of steel which is welded on to but not fused through the welding operation, said backing strip having a thickness not less than 0.08 in., and subsequently removing the steel backing strip by a flame machining operation.

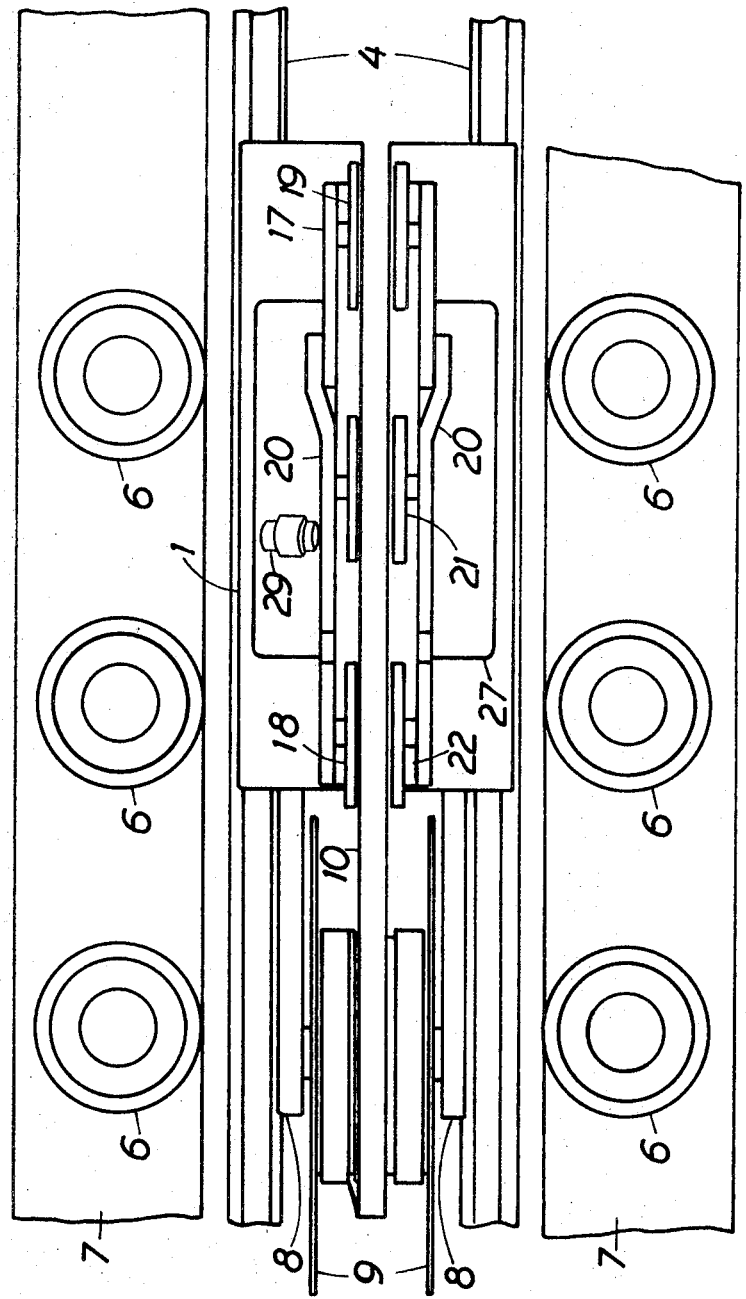

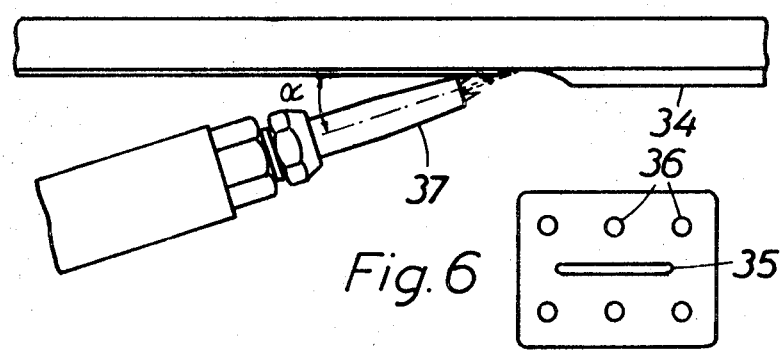
Fig. 5
Fig. 6
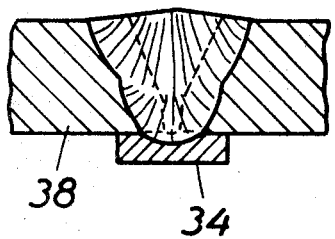
Fig. 7
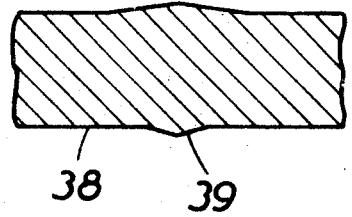
Fig. 8

METHOD OF BACKING STRIP REMOVAL

This invention relates to arc welding, more particularly to the arc welding of butt joints between heavy sheet steel members. The term "heavy sheet steel" here should be understood to indicate a thickness of 5 mm. (0.2 in.) or more. In the first place, the invention is concerned with the welding of sheet steel having a thickness of (8 mm. five-sixteenth in.) or more.

In these last years, the method of arc welding heavy sheet steel from one side only has received much attention in shipbuilding and other heavy industry. Welding from one side only necessitates the use of a backing member to retain the liquid weld metal at the root of the weld. Many different types of backing members have been tried. For instance, one known type of backing member consists of a copper bar with or without a layer of granular flux interposed between the copper bar and the joint; another type consists of a steel tape having a sprayed-on coating of refractory oxide; and a third type consists of a metal bar or metal strip supporting a glass fibre tape. These and similar backing members require a careful adjustment of the welding current used in depositing the first bead to avoid fusion penetration into the backing member. Moreover, they provide no safety against root defects even at carefully adjusted welding conditions and are liable to various other practical difficulties and disadvantages.

On the other hand, it is also known to employ a backing member consisting of a steel strip of substantial thickness which is welded onto the work during the welding of the joint but is not fused through. Said method possesses some advantages over other known or suggested methods for welding heavy sheet steel from one side only. The method is simple and demands no expensive accessories; the welding conditions are not critical, and root defects rarely occur. These advantages are, however, counterbalanced by serious disadvantages. The abrupt change of cross section due to the welded-on steel strip produces an unfavorable distribution of load stress at the edges of the weld. The narrow crevices between the steel strip and the workpieces at both sides of the root of the weld are liable to crevice corrosion. Also, the presence of the steel strip on the finished work is often objectionable for aesthetic and/or functional reasons. These disadvantages have practically excluded the use of the steel strip backing from many important fields of application, for instance shipbuilding.

The invention provides an improved method of producing and finishing a butt weld between heavy sheet steel members which comprises the steps of positioning a pair of heavy sheet steel members to form a butt joint, applying a steel backing strip having a thickness not less than 2 mm. (0.08 in.) to the joint so as to engage the work surface at both edges of the joint, welding the joint from the side opposite to said backing strip by the consumable-electrode arc welding process, the welding conditions being so adjusted that the backing strip is welded onto the work but is not fused through, and removing the steel backing strip by the flame desurfacing process. This improved method eliminates the disadvantages and limitations of the prior methods for welding from one side and provides a perfect weld. crosspiece crosspiece The flame desurfacing process (also known as "flame machining" and "flame scarfing") is a well-known process in which a stream of oxygen is discharged towards a workpiece through a nozzle which is held at an acute angle to the surface of the work and advanced along a zone of the work at a uniform speed to cause the stream of oxygen successively to oxidize and remove a surface layer of steel from said zone. To initiate the thermal action of the stream of oxygen on the steel, the spot at which the cut is to begin has to be preheated by means of one or more preheating flames.

In the method according to the invention, the removal of the backing strip is preferably performed in one pass of the flame machining nozzle. The contour shape of the weld cross section can be controlled by adjustment of the flame machining conditions. It is possible to obtain a weld surface which is practically flush with the surface of the work. As a rule it is, however, preferable to adjust the conditions in such a manner that the edge zones of the backing strip which are not welded to the work are completely removed but a small portion of the backing strip between said edge zones remains to form a low ridge along the weld.

Figure 3:
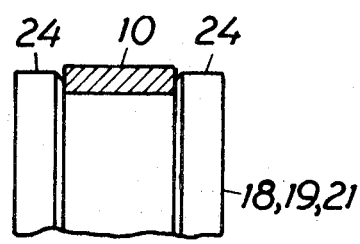

In the attached drawings exemplifying the invention,

FIG. 1 is a side view of a trolley for supplying a backing strip to the work and keeping the backing strip in engagement with the work during the welding operation, FIG. 2 shows the trolley from above together with means for supporting and holding the work, FIG. 3 is a front view on a larger scale of a detail of the apparatus of FIGS. 1 and 2, FIG. 4 shows a number of sectional views of joints suitable for the method according to the invention, FIG. 5 is a side view of a flame machining tool and a workpiece during the removal of the backing strip, FIG. 6 is a view, on a larger scale, of the end face of the nozzle piece of the flame machining tool of FIG. 5, FIG. 7 is a cross section of a welded workpiece prior to removal of the backing strip, and FIG. 8 is a cross-sectional view of a welded workpiece after removal of the backing strip.

The trolley shown in FIGS. 1—2 comprises a chassis 1 having one pair of driven front wheels 2 and one pair of idle back wheels 3 rolling on rails 4 forming a track at the bottom of a trench sunk in a bed 7 provided with magnets 6 for holding the sheets 5 to be welded. A pair of brackets 8 attached to the front end of the trolley chassis rotatably support a reel 9 carrying a coiled strip 10 of mild steel. The pistons 13, 14 of a pair of hydraulic cylinders 11, 12 provided on the chassis support a frame 17 by means of pivot joints 15, 16. The frame rotatably supports two pressure rolls 18, 19. A third pressure roll 21 disposed between the pressure rolls 18, 19 is supported by a pair of levers 20 pivotally attached to the frame 17. The free ends of said levers are connected by a cross piece 22. A compression spring 23 fitted between said cross piece and the frame 17 exerts an upward thrust on the roll 21 through said levers. The pressure rolls are provided with flanges 24 (FIG. 3) serving to guide the steel strip 10. The height of said flanges is less than the thickness of the steel strip, which is therefore pressed into firm engagement with the work 5 by the pressure rollers. One hydraulic cylinder 12 is connected with the chassis by a pivot joint 25 permitting the frame 17 freely to adjust itself to local deviations of the work from the horizontal direction. The vertical movability of the pressure roll 21 in respect of the other two pressure rolls allows a firm engagement of all of the three rolls with the backing strip 10 also when the respective portions of the backing strip are not exactly on a line.

The trolley 1 is advanced during the welding operation at the same rate as a welding electrode 26 operating at the upper side of the joint, so that said electrode is always straight above the center of the pressure roll 21. If desired, two or more electrodes operating simultaneously may be used instead of the single electrode 26.

The housing 27 provided between the hydraulic cylinders 11, 12 encloses a motor and gearing for driving the wheels 2, as well as the required apparatus for controlling the operation of the motor. A standard 28 mounted on the roof of the housing 27 supports a tube 29 containing a heat radiation sensitive member (selenium cell) adapted to sense the heat radiation from a part of the backing strip 10 slightly in front of the part straddled by the flanges of the roll 21. Said radiation sensitive member is connected in a motor control circuit causing the motor to advance the trolley continuously or discontinuously in such a way as to maintain the heat sensitive member within a zone of the backing strip having a temperature within given limits. Alternatively, the trolley may be advanced at a constant rate and the heat sensitive member be adapted to control the welding current through suitable control means.

It is preferable to employ steel strips of identical dimensions in welding different sheet thicknesses, in order to be able to use one single set of pressure rolls 18, 19, 21 for the welding of workpieces of all thicknesses. FIGS. 4a—g show a number of joints in sheet steel of different thicknesses, all of which joints are adapted to the use of a backing strip of the size 5×20 mm. The measurements of the joints and the recommended welding conditions in the submerged-arc welding of each particular joint are specified in the table here below.

| Figure | T, mm. | s, mm. | h, mm. | v, degrees | Electrode diameter, mm. | Number of beads | Welding current, a. | Welding voltage, v. | Welding speed, m./hour |
|---|---|---|---|---|---|---|---|---|---|
| 4a | 10 | 3 |  |  | 7 | 1 | 1,050 | 36 | 45 |
| 4b | 12 | 3 |  |  | 7 | 1 | 1,140 | 36 | 40 |
| 4c | 15 | 3 | 5 | 50 | 6 | 2 | (1) 1,050 / (2) 1,050 | 35 / 36 | 40 / 40 |
| 4d | 20 | 3 | 5 | 50 | 6 | 2 | (1) 1,000 / (2) 1,100 | 35 / 36 | 25 / 22 |
| 4e | 25 |  |  | 6 | 50 | 6 | 3 | (1) 1,050 / (2) 1,000 / (3) 1,000 | 32 / 36 / 36 | 25 / 25 / 25 |
| 4f | 30 |  |  | 6 | 50 | 6 | 4 | (1) 1,050 / (2) 1,050 / (3) 1,050 / (4) 1,050 | 32 / 34 / 36 / 36 | 25 / 25 / 25 / 20 |
| 4g | 35 |  |  | 6 | 50 | 6 | 5 | (1) 1,050 / (2) 1,050 / (3) 1,050 / (4) 1,050 / (5) 1,050 | 32 / 34 / 34 / 36 / 36 | 25 / 25 / 20 / 20 / 20 |

The invention is not limited to the types and sizes of joints and the welding conditions above specified, but includes, for instance, the joint sizes and the welding conditions specified in Welding Handbook, IVth edn., American Welding Society, 1958, Section 2, tables 28.14 and 28.31.

The force for keeping the backing strip in engagement with the work may be exerted by means of one or more sliding pressure blocks or pressure pads instead of the pressure rolls above described. Said pressure pads may be provided with coolant channels connected to a coolant circulating system and may, if desired, also be used as contact members for transmitting the welding current to the work. The flame desurfacing or flame machining tool shown in FIGS. 5 and 6 has a tip or nozzle 37 provided with a slot-shaped orifice 35 for the cutting oxygen and a number of round orifices 36 for the preheating gas (a mixture of oxygen and acetylene). Flame machine tools of this type and their principles of operation are well known and require no further description. To effect the removal of the backing strip 34 from the work, the operating conditions are adjusted in such a way that the edge portions of the backing strip 34 which are not welded to the sheets 38 (FIG. 7) are removed entirely, while the center portion of the backing strip is reduced to a small crest forming a low ridge 39 (FIG. 8).

Figure 4A:
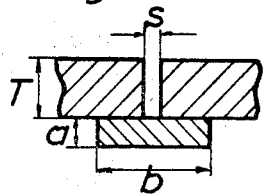
Figure 4B:
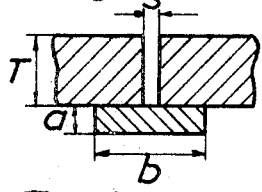
Figure 4C:
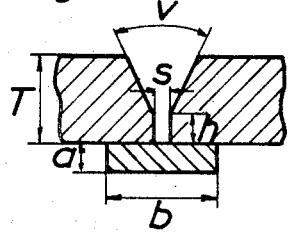
Figure 4D:
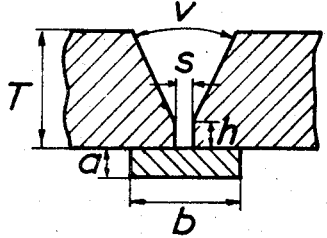
Figure 4E:
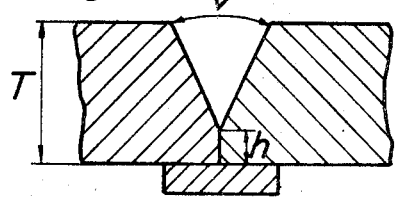
Figure 4F:
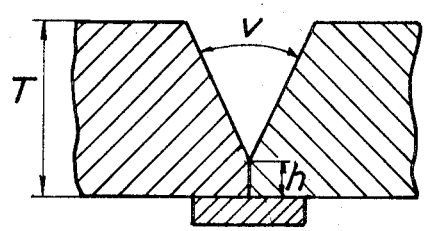
Figure 4G:
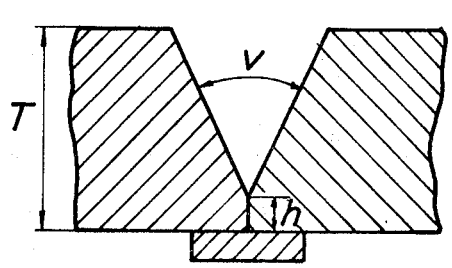

To cite an example, the following data have been employed in removing a backing strip of the size 5×20 mm. from a weld as shown in FIG. 7, the joint preparation and the welding data being as specified with reference to FIG. 4c:

| | |
|---|---|
| Cross section of the oxygen orifice 35 | 0.7×7 mm. |
| Oxygen pressure | 5 kg./cm.² |
| Angle of incidence, α | 18° |
| Speed of advancement | 1 m./min. |
| Height of the ridge (approximately) | 1.5 mm. |

The lines in the weld cross section in FIG. 7 represent the directions in which crystallization proceeds during the solidification of the weld metal. It is notable that the crystallites in the root zone of the weld are orientated in substantially vertical directions. In welding without a metallic backing strip, the orientation of the crystallites is substantially horizontal in the root zone of the weld, the crystallites growing towards each other from both edges of the weld. This tends to produce some segregation in the symmetry plane in the root zone of the weld, resulting in a deterioration of the mechanical properties. With the substantially vertical direction of crystal growth obtained with the process according to the invention, the mechanical properties will be uniformly good throughout the weld.

The invention is not limited to any particular method of automatic consumable-electrode arc welding. In addition to submerged-arc welding already mentioned by way of example with reference to FIG. 4, it is possible to employ, for instance, gas-shielded arc welding or welding with wire-sheathed flux coated electrodes, or combinations of said methods. For instance, the root bead may be deposited by gas-shielded arc welding while the remainder of the joint is welded by the submerged-arc process.

I claim:

1. A method of producing and finishing a butt weld between a pair of heavy sheet steel members comprising the steps of disposing said sheet steel members with adjacent edges forming a butt joint, applying a steel backing strip having a thickness not less than 2 mm. (0.08 in.) against the underside of both of said sheet steel members along said butt joint, welding together the edges of said butt joint and a medial portion of said backing strip by arc welding with at least one fusible electrode supplied from above and advanced along said butt joint, adjusting the welding conditions so that the fusion zone in said backing strip has a depth less than the thickness of said backing strip and a width less than the width of said backing strip, whereby edge zones of said backing strip are not welded to said sheet steel members, and thermochemically removing said edge zones of said backing strip and at least the major portion of said medial portion of said backing strip between said edge zones by a stream of cutting oxygen discharged from a nozzle advanced along said backing strip, said nozzle being at an acute angle to said backing strip whereby the stream of cutting oxygen engages said backing strip ahead of said nozzle.

2. A method as claimed in claim 1 including the step of adjusting the stream of oxygen to retain a small portion of the medial portion of the backing strip between said edge zones to form a low ridge.

3. A method as claimed in claim 1, the step of thermochemical removal consisting of a single pass of said nozzle along said backing strip.